(12) United States Patent
Burns

(10) Patent No.: US 10,357,816 B1
(45) Date of Patent: Jul. 23, 2019

(54) CONDENSER TUBE-TO-TUBESHEET JOINT IMPROVEMENT

(71) Applicant: Daniel C Burns, Cary, NC (US)

(72) Inventor: Daniel C Burns, Cary, NC (US)

( * ) Notice: Subject to any disclaimer, the term of this patent is extended or adjusted under 35 U.S.C. 154(b) by 329 days.

(21) Appl. No.: 15/330,331

(22) Filed: Sep. 6, 2016

(51) Int. Cl.
*B21D 53/08* (2006.01)
*B21D 39/06* (2006.01)
*B23P 15/26* (2006.01)

(52) U.S. Cl.
CPC .............. *B21D 53/08* (2013.01); *B23P 15/26* (2013.01)

(58) Field of Classification Search
CPC ........ B21D 53/08; B21D 39/06; B21D 53/02; B23P 15/26; B21C 37/22
See application file for complete search history.

(56) References Cited

U.S. PATENT DOCUMENTS 5,582,246 A * 12/1996 Dinh .................. F28F 1/20
165/181

* cited by examiner

*Primary Examiner* — David P Bryant
*Assistant Examiner* — Lawrence Averick
(74) *Attorney, Agent, or Firm* — Patrick J. Walsh

(57) ABSTRACT

A tube-to-tubesheet joint for steam condensers having a plurality of holes drilled in condenser tubesheets, a plurality of 8 mil triangular cut serrations in the wall surface of each hole, locating the serrations in a set positioned centrally of the wall surface, inserting a tube end into each hole, and forming a mechanical interference fit between tube wall and hole wall surface. In modified embodiment for thick tubesheets, plural sets of serrations with sets spaced apart may be formed in tubesheet holes.

7 Claims, 2 Drawing Sheets

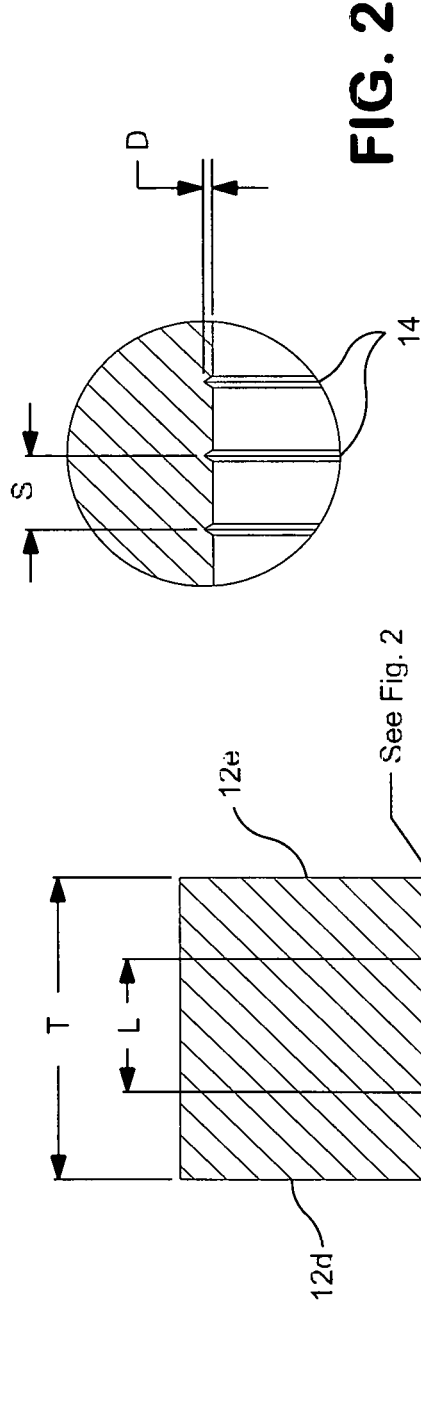
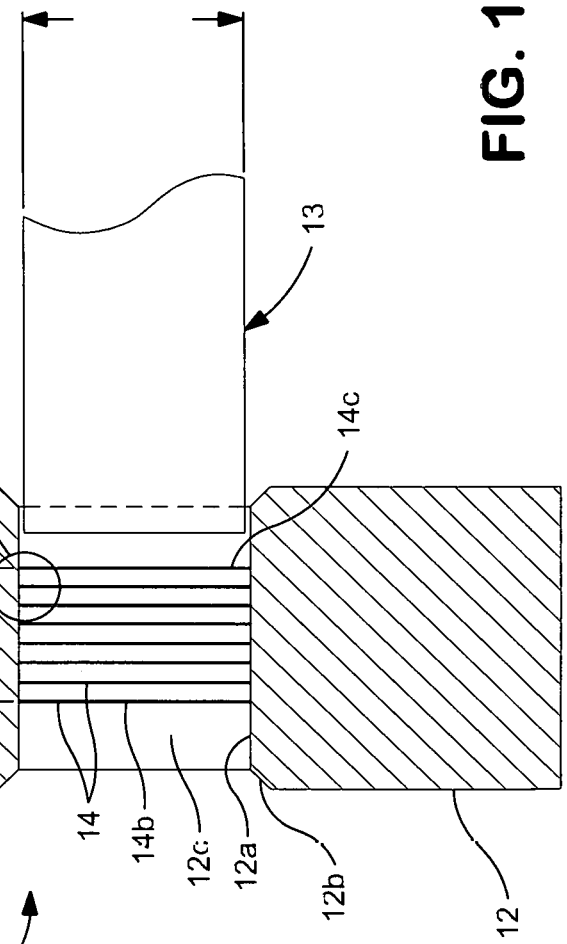

CONDENSER TUBE-TO-TUBESHEET JOINT IMPROVEMENT

FIELD OF THE INVENTION

The present invention relates to condensers for condensing low energy steam exhausting from steam turbines, and more particularly to improvements in joining condenser tubes to tubesheets which form part of a condenser.

BACKGROUND OF THE INVENTION

The main function of a utility condenser is as the name implies to condense the low energy steam exhausting from the turbine. Small diameter thin-walled condenser tubes that can number as many as 70,000 convey and contain the cooling medium (usually water) through this heat exchanger to produce the desired condensation of that steam. During operation, the waterbox side of each of the two tubesheets at the opposite ends of a condenser holds an hydraulic pressure of up to about 70 psig while the shellside of the tubesheet experiences a high vacuum as low as 1 in hga. Thus, the tube-to-tubesheet joint of a condenser must reliably withstand a differential pressure of up to 70 psig and other loads experienced during operation.

The tubesheets themselves are flexible, flat plates from ½ an inch to about 2 inches in thickness and can be of a circular, square, rectangular or a trapezoidal shape that could typically vary from say 4 ft×4 ft to 20 ft by 15 ft., depending on the size of the power plant. These tubesheet plates are of a corrosion resistant material that have been drilled to be slightly larger than the outside diameter of the tubes. The drilled hole pattern is in accordance with the designer's requirements but accommodates all the tubes and also the attachment of the tubesheet and waterbox to the shell of the condenser at its periphery.

The tubes are required to be firmly and reliably attached to their tubesheets since they must be absolutely prevented from pulling-out from their joint with the tubesheet and/or leaking any of the cooling medium into the steam side during operation. No tubes or tube joints can leak. After sticking the tubes into the condenser, the tubes are fastened at their ends into the tubesheets. Though welding is sometimes employed to make the joints, today most new and retubed condensers use tube joints that are attached to their tubesheets by a mechanical interference fit using a handheld, manually operated tool on each joint. The tool expands the diameter of the tube into the plastic region of the material. At the same time, it expands the surrounding tubesheet hole enough so that after the tool is removed, the tubesheet material around the hole closes elastically, squeezing down on the expanded tube and producing a high contact pressure that makes the joint strong and leakproof. As has been suggested above, large condensers often require 100,000 or more of these joints to be made.

Since the 1960's, significant improvements to the leak tightness and strength of this joint have been made as the materials of the tube and tubesheets have changed away from the usual and older application of traditional copper alloys of both tube and tubesheet. Now, particularly when retubing an existing condenser, often the tube is a thin, hard material like stainless steel while the tubesheet is a relatively soft copper alloy. Historically, with copper alloy tubes, joint strength was improved using notches or grooves. Typically a quantity of two notches or grooves were machined in each tubesheet hole (@ ~⅛" width each). Notches or grooves had been employed by many condenser suppliers with copper bearing tubesheets to obtain better sealing and joint strength.

In the US, serrations were developed after applying an EDF (a French utility) engineer's experience from the art he presented in his paper at an EPRI condenser conference in the 1980's[1]. The paper showed sketches of a joint (to be used for a titanium tubed condenser) with a multiplicity (6 to 8) separate triangular shallow serrations about $1/64^{th}$ inches deep and wide at the top, separated by about $1/16^{th}$ inch. It demonstrated that much higher joint pullout load strength occurred with (presumably) better leak tightness. Evidently the interference fit process forced ridges to form on the tube that pressed into the tubesheet to increase its holding power. Remembering this European technology, an engineer (J M Burns now of Burns Engineering Services Inc.) with a major architect-engineering company about 6 years later specified the geometry of that serrated joint to be used by a US contractor in 1989 when retubing a US condenser that had titanium tubes and a titanium tube sheet. Tooling was developed and made by the contractor to cut those tubesheet serrations in the field; pullout tests on a sample coupon with that joint showed almost a doubling of joint strength compared to a plain joint. The joint design was subsequently cut into all of approximately 20,000 tubesheet holes of that condenser. That engineer wrote a paper about the experience several years later to inform the industry[2]. Though it was judged to be adequate, the metal-to-metal tube contact with harder metals did not extend for the full depth into the tubesheet serrations or grooves and so some potential strength was likely lost. It was also found that all shards of metal needed to be deburred from the process, and brushed out from the grooves formed within each tubesheet hole before being able to stick the tubes into the condenser through those close clearance holes. In addition, scratches often occur on the outer tube surfaces and the metal serration points can sometimes be knocked off as the tubing is inserted through the hole. Not only are these scratches a potential site for tube failure, the small metal particles/chips that can get knocked off in the serrations interfere with making a fully reliable joint when swaged.

[1] 1983 EPRI Technical Conference
[2] J M Burns, et al, "New Approach to One-For-One Retubing of Titanium Condenser Improves Reliability For Continued Unit Operation", EPRI Technical Conference, 1993.

Since then, when specified by the utility owner or his representative in the US, the same serrated joint enhancement as described above has been made and used in the field by most contractors without much variation. It typically consists of a quantity of 6-8 machined narrow cuts of depth $1/64"$ with each serration tip spaced approximately $1/16"$ apart. Note however the standard size or quantity is not a written industry standard.

Nonetheless, there were aspects of this serrated joint (as suggested above) that can be improved to make it even stronger and to make it more cost effective to install than the current practice. Cutting in the grooves takes time, labor and tooling. To put it into context, each of up to 100,000 tube holes must have a cutting tool properly positioned and then the tubesheet hole must be carefully serrated. After the cutting, each hole must be deburred and brushed-out as necessary; then the hole must be inspected and possibly rebrushed before the tube can be pushed into the condenser and finally swaged into place. If it optimistically takes only 1 minute for the entire serrating process of each tubesheet hole of a 50,000 tube unit, including the hole brushing, that is a total of over 1,600 man hours. The enormous quantity of holes to be serrated for the joint also usually indicates some holes will be missed, not properly brushed-out or inspected before the tubes are pushed. This can result in a bad tube installation and/or a poor tube-to-tubesheet joint.

SUMMARY OF THE INVENTION

This invention consists of the same number of triangular serrated holes but of a much smaller, shallower configuration of 8 mil (i.e., slightly greater than $1/128$ of an inch). Though the difference may seem inconsequential, it is an innovation with huge benefits. The advantages and objects of this invention are as follows:
1. The shallower serrations allow more complete penetration of the tube wall into the narrow cuts of the tubesheet and fuller contact of the tube with the tubesheet. Depending on the tube material and the tubesheet material hardness and other properties, the combination with the shallower grooves may increase the pullout strength and the leak tightness of the resulting joints.
2. The shards of metal from cutting the shallower serrations are proportionally smaller and of a lesser quantity. That results in:
   a. Decreased time & labor to install the serrations and remove the metal out from each of the tubesheet holes.
   b. If somehow shards are overlooked, because they are smaller in size, a lesser interference with the quality and reliability of the tube joint.
   c. The shallower serrations shall provide decreased wear on tooling and can be installed quicker. Fewer lighter scratches shall reduce damage to the outside diameter of the tube that minimize the potential cause(s) of latent tube failure due to a weakened region of the tube than can act as a stress riser under the various cyclical loads that act on the tubes.

Another major reason for the lighter serration is the speed at which tubing can be stuck or installed. The slightly smaller serration teeth will not "grab" or catch as much on the outer tube surfaces compared to a larger serration as it is pushed through the tubesheet hole.

Specific examples of tube-to-tubesheet joint improvements of this invention are included in the following description for purposes of clarity, but various details can be changed within the scope of the present invention. Other and further objects of the invention will become apparent with an understanding of the following detailed description of the invention or upon employment of the invention.

BRIEF DESCRIPTION OF THE DRAWING

Preferred embodiments of the invention have been chosen for detailed description to enable those having ordinary skill in the art to which the invention appertains to readily understand how to construct and use the invention and is shown in the accompanying drawing in which:

FIG. 1 is a section view of tube-to-tubesheet joint according to the invention.

FIG. 2 is an enlarged detail view of hole drilled in tubesheet showing serrations formed in the hole wall surface.

Referring to FIGS. 1 and 2, a condenser tube-to-tubesheet joint 10 comprises a normally vertically disposed tubesheet 12 with a plurality of drilled holes 12*a* to receive ends of thin walled condenser tubes 13. Two tubesheets at opposite ends of a condenser have aligned, drilled holes for forming tube joints. FIG. 1 illustrates one such tube joint.

Typical tubesheet thickness T ranges from 1.0" to 1.50" in increments of 0.125". Tubesheet materials are selected from one of carbon steel, Muntz metal, aluminum bronze, silicon bronze, titanium, copper nickel, and stainless steels 304, 316, 317, 2205, and 2507. Typical tube diameters are ¾", ⅞", 1.0", 1.125", and 1.25".

In accordance with the invention, a plurality of holes are drilled through a tubesheet and hole edges bevelled 12*b* for ease of receiving a tube end and minimizing damage during sticking and operation on the back face. Within each hole, a set of preferably 8 triangular serrations 14 are formed in the cylindrical wall 12*c* defining each hole. The set of serrations are placed centrally of the hole with outermost serrations 14*b-c* of the set spaced equally from tubesheet faces 12*d-e*. For a 1" thick tubesheet, the serration set occupies a 7/16" length L within tubesheet hole with outermost serrations spaced equally from tubesheet faces.

For tubesheet thickness in a range of 1.0 to 1.50 inches, the spacing of outermost serrations in each serration set is determined by: $(T-7/16")/2$ where T is tubesheet thickness.

The serrations are triangular cuts into the hole wall having a depth preferably of 0.008" (8 mils), and are spaced apart a distance S, preferably 1/16". FIG. 1 shows a tube hole prepared with serrations for receiving and forming joint with tube. After insertion of tube into operating position within the hole, a hand-held manually operated tool is inserted into the tube end to form a mechanical interference fit of tube and hole in establishing the desired tube-to-tubesheet joint.

Figure 3:
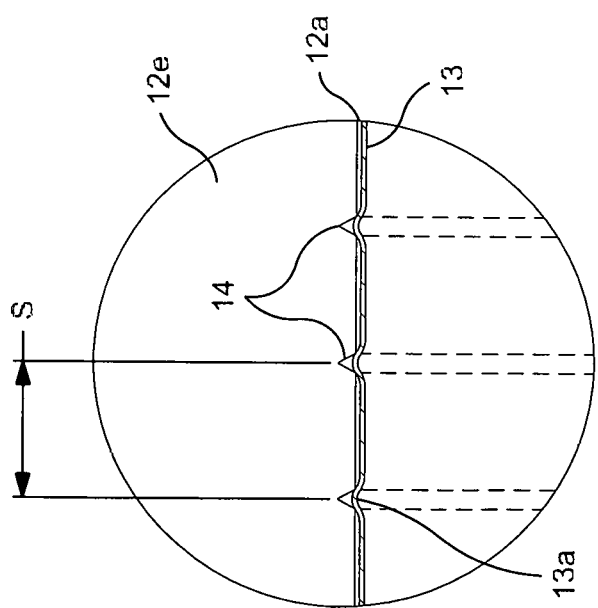
FIG. 3 is an enlarged detail view of FIG. 2 showing tube impressions expanded into serrations.

FIG. 3 is an enlarged detail view of FIG. 1 with tube 13 in tubesheet hole 12*a*, the hole having serrations 14. After the tool has expanded the tube to establish a mechanical interference fit, tube impressions 13*a* extend into serrations 14.

The joint described with reference to FIG. 1 is a preferred embodiment of the invention. Other embodiments vary the number and spacing of serrations within a drilled hole while maintaining triangular 8 mils form of each serration. A set of between 6 and 10 serrations may be employed while maintaining preferred 7/16" length of tubesheet for each serration set, and serration spacing between adjacent serrations accordingly.

Figure 4:
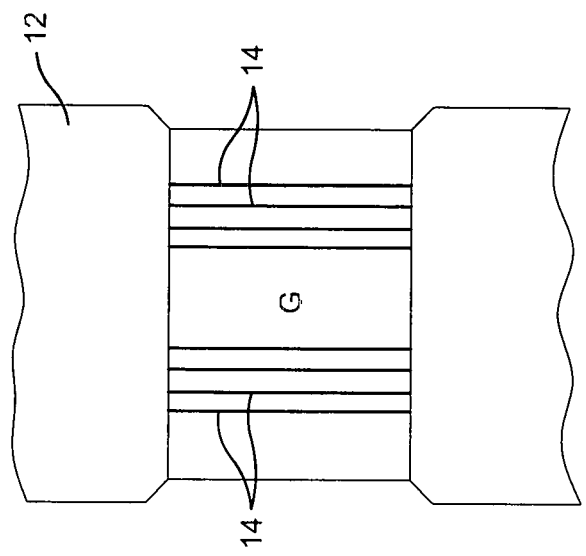
FIG. 4 is a modified embodiment of the invention applied to thick tubesheets.

FIG. 4 is a modified embodiment of the invention particularly suitable for thick tube sheets. Instead of having a continuous set of serrations as in FIG. 1, there are installed two sets of serrations separated by a gap or space G between them. The length of space G is defined by available hole length. The serrations are 8 mil deep and within a set are typically spaced $1/16^{th}$ inch apart. Space length starts at a minimum of $1/8^{th}$ inch for 1.125" and 1.25" thick tube sheets, and maybe as large as ¼" for 1.5" thick tubesheets.

An inventive method may be stated as comprising the following steps. Form a plurality of holes preferably by drilling in spaced tubesheets for receiving ends of condenser tubes, bevelling hole edges at tube sheet faces, forming a plurality of serrations within each tubesheet hole, the serrations located in a central section of the hole spaced equally from tubesheet faces, forming each serration as a triangular cut 8 mils into hole face, running tubes into the condenser to insert tube ends into drilled and serrated holes, and forming a mechanical interference fit between serrations and tube outer wall wherein tube outer wall impressions extend into serrations. For thick tubesheets, the plurality of serrations may be divided into plural sets of equal numbers of serrations with a space or gap located between sets.

Various changes may be made to the structure embodying the principles of the invention. The foregoing embodiments are set forth in an illustrative and not in a limiting sense. The scope of the invention is defined by the claims appended hereto.

I claim:

1. A method for forming tube-to-tubesheet joints in exhaust steam condensers having spaced tubesheets, each tubesheet having interior and exterior faces with the tubesheets interior faces confronting each other, and the condensers further adapted to receive tubes extending by their ends between the tubesheets, the method comprising the steps of:

forming a plurality of holes opening through the interior and exterior faces of each of the confronting tubesheets, the holes being aligned for receiving the ends of tubes, the holes being defined by cylindrical wall surfaces in the tubesheets, forming a plurality of serrations in the wall surface of each tubesheet hole, forming each serration as a triangular cut approximately 8 mils deep into each tubesheet hole wall surface, sticking tubes into the condenser for inserting the opposite ends of each tube into the aligned serrated holes, inserting a tool into each tube end situated in a serrated hole, and forming a mechanical interference fit between serrations and tube ends wherein outer tube wall impressions extend into the serrations.

2. A method as defined in claim 1 including the further step of forming the serrations in a central section of the tubesheet hole wall surface.

3. A method as defined in claim 2 which includes the step of locating the central section of serrations spaced equally from tubesheet exterior faces.

4. A method as defined in claim 1 including the further step of forming serrations numbering in a range of six to ten in the wall surface.

5. A method as defined in claim 1 including the step for forming eight serrations in the wall surface.

6. A method as defined in claim 1 in which in the step of forming an interference fit, tube impressions extend into serrations.

7. A method as defined in claim 1 in which the plurality of serrations extend concentrically of the wall surface of each tube sheet hole.

* * * * *